Sept. 20, 1966  L. R. ZUMWALT  3,274,066
UNPURGED FUEL ELEMENT
Filed Oct. 5, 1965

INVENTOR.
LLOYD R. ZUMWALT

ATTORNEY

United States Patent Office 3,274,066
Patented Sept. 20, 1966

3,274,066
UNPURGED FUEL ELEMENT
Lloyd R. Zumwalt, La Jolla, Calif., assignor, by mesne assignments, to the United States of America as represented by the United States Atomic Energy Commission
Filed Oct. 5, 1965, Ser. No. 493,280
5 Claims. (Cl. 176—68)

The invention described herein was made in the course of, or under Contract AT(04-3)-167 with the United States Atomic Energy Commission.

The present invention generally relates to fuel elements for nuclear reactors and more particularly relates to fuel elements for high temperature, gas-cooled nuclear reactors, which fuel elements include means for attenuating the migration of fission products therefrom.

In the generation of power by nuclear reactors operating by fission, economy is a prime consideration, as it is with other types of power generators. In this connection, it is important to obtain high efficiency in the transfer of heat from the nuclear fuel to the cooling medium. It is also an advantage to be able to provide a high power density so as to be able to generate a large amount of heat in a relatively small core under controlled conditions.

Gas-cooled nuclear reactors offer the possibility of increasing the thermal efficiency of heat transfer from the fuel to the coolant since the coolant does not limit the temperature of operation, as is the case with various liquid-cooled reactors. At the higher-operating temperatures of which gas-cooled neutronic reactors are theoretically capable, the thermal efficiency in transferring heat from the nuclear fuel to the coolant is considerably increased.

However, in reactors operating at high power levels and high temperatures, relatively large quantities of fission products are produced which should desirably be kept out of the main coolant stream. Fuel elements for these reactors have incorporated various types of purging systems wherein a small fraction of the gas coolant flow has been diverted from the main coolant stream and directed through the fuel elements in order to establish a purge flow through the fuel elements that would carry fission products to suitable traps. Such purge systems have necessarily added to the expense of the fuel elements and of the associated reactors.

It is desirable to produce fuel elements for use in gas-cooled nuclear reactors that do not require elaborate fission product trapping systems. It is also desirable to provide fuel elements that can be simply and inexpensively constructed to include means for attenuating the migration of fission products therefrom.

Accordingly, it is the principal object of the present invention to provide an improved fuel element for gas-cooled nuclear reactors. It is also an object to provide a fuel element for a nuclear reactor, which element employs a novel and efficient system for retention and attenuation of fission products generated in the fuel element during operation. It is another object to provide an improved, simple, economical fuel element for high temperature gas-cooled nuclear reactors having a high degree of efficiency of heat transfer therefrom to a coolant.

Further objects and advantages of the present invention will be apparent from a study of the following detailed description and of the accompanying drawings of which:

Generally, the invention provides a fuel element 11 for a nuclear reactor which comprises an elongated outer shell 13 of graphite which is treated to prevent escape of fission products and which has disposed therein nuclear fuel bodies 15. Fuel in particle form, disposed within a supporting matrix, is utilized; the particles have excellent fission product containment characteristics so that fission product release by the particles is reduced. Moreover, provision is made for the controlled containment of fission products within the fuel element to prevent their entry into the primary coolant stream. In this regard, fission products that are released by the fuel particles are prevented from direct escape from the fuel element by a barrier formed within the external shell 13 and are either retained by fission product trapping means or are delayed for a time sufficient so that the fission products decay to a non-contaminating form before exiting to the fluid coolant stream. The fission product trapping means are disposed solely within the fuel element, eliminating any need for a purge stream of coolant gas to scavenge the fission products to an external fission product trapping system. As can be seen, the fuel element 11 is capable of being relatively inexpensively constructed.

Figure 1:
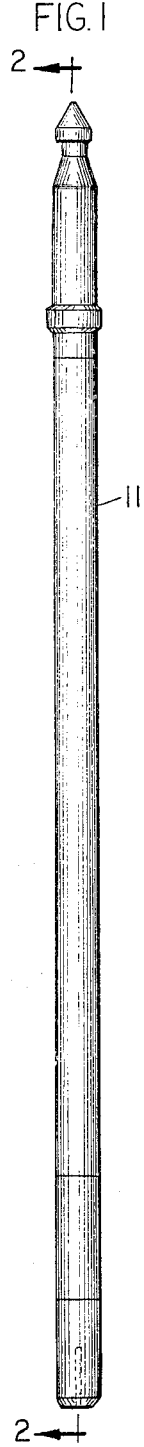
FIGURE 1 is an elevational view of a fuel element embodying various of the features of the invention.
Figure 2:
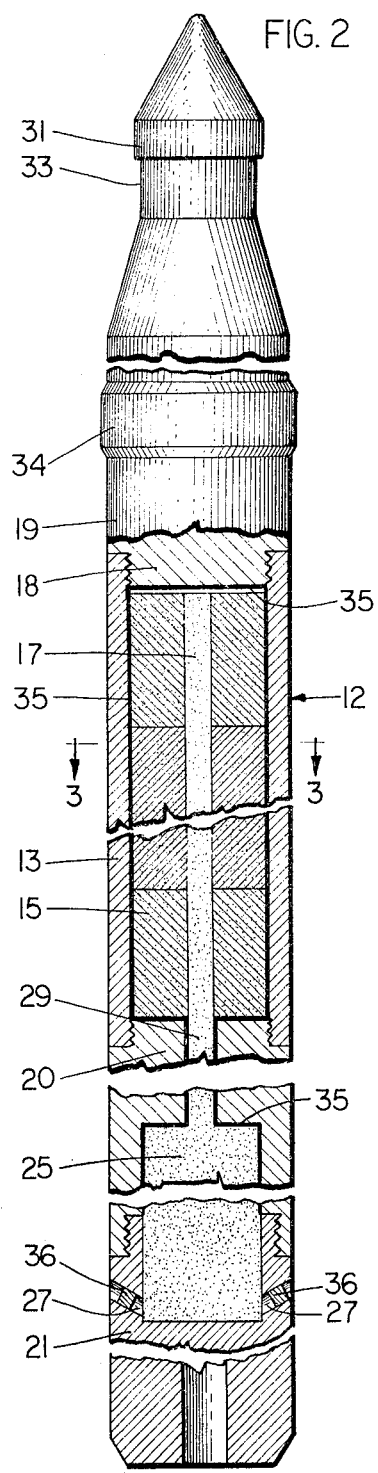
FIGURE 2 is an enlarged view of the fuel element shown in FIGURE 1, generally in section along line 2—2 of FIGURE 1.
Figure 3:
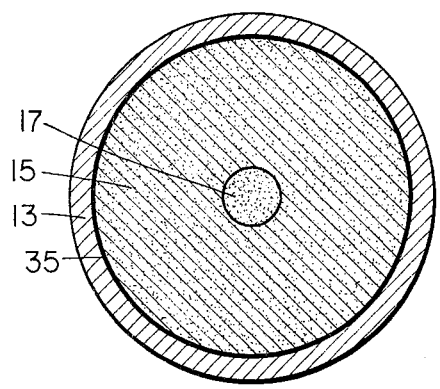
FIGURE 3 is an enlarged sectional view taken along the line 3—3 of FIGURE 2.

Referring now specifically to the drawings, the particular embodiment of the fuel element 11 shown in FIGURES 1 through 3 is of the type adapted for utilization in a high-temperature gas-cooled nuclear reactor, such as the reactor which is known as the HTGR (High Temperature Graphite Reactor). This reactor is described in Nucleonics, volume 18, Number 1, pp. 86–90, January 1960. The fuel element 11 comprises a body section 12 wherein nuclear fuel material is disposed. In the illustrated embodiment, the body section 12 includes a sleeve 13, the inner bore of which serves as a cavity for holding the nuclear fuel material, which is preferably in the form of nuclear fuel compact 15. The sleeve 13 is formed of nuclear moderating material, preferably graphite.

Each fuel compact 15, as illustrated in FIGURE 1, comprises a mixture of fuel and moderator formed into a shape that provides a central hollow core. The configuration of the plurality of fuel compacts 15 is such that when they are aligned in stacked relation within the sleeve 13, the hollow cores provide a longitudinal passageway 17 throughout the active fueled region of the fuel element 11. Thus, for examlpe, the fuel compacts illustrated in FIGURE 1 are each in the form of a right circular cylinder with a central hole. It will be understood that other types of nuclear fuel material can also be utilized.

At the upper end of the body section 12, the sleeve 13 is closed by a threaded plug 18, which may be an integral portion of a top reflector 19, which is fabricated of neutron reflecting material, preferably graphite. The graphite plug 18 is screwed into the graphite sleeve 13 and is sealed by silicon brazing or the like to render the joint as impermeable to fission products as the sleeve itself.

The body section 12, at its lower end, includes a coupling section 20 by which it attaches to a bottom connector 21.

The coupling section 20 is screwed onto the bottom end of the sleeve 13 and is sealed by silicon brazing or the like. The coupling section 20 is also screwed onto the upper end of the bottom connector 21. The coupling section 20 in combination with the bottom connector 21 provides a fission product trap chamber 25. Channels 27 in the bottom connector 21 link the bottom of the trap chamber 25 in fluid communication with the exterior surface of the fuel element 11, wherealong the fluid coolant stream flows, and thus serves as vents for gaseous fission product release. The channels 27 may be any suitable number, for example, six, and of any suitable size, for example, about 0.5 inch in diameter, sufficient to vent the fission product trap. The coupling section 20 and the bottom connector 21 are constructed of suitable structural materials having acceptable neutron reflecting properties, preferably graphite. The coupling section 20 and the bottom connector 21 serve as the bottom neutron reflector portion of the fuel element 11.

For handling of the fuel element 11, the top reflector 19, which may be made from a solid block of graphite, is provided with a pointed head 31 and neck 33 readily engageable by grappling means (not shown). In addition, the top reflector 19 is formed with a spacing ring 34 to facilitate spacing between fuel elements within a nuclear reactor core.

A passageway 29 in the coupling section 20 interconnects the passageway 17 formed by the cores of the fuel compacts 15 and the fission product trap chamber 25. Thus, a continuous passageway is provided through the active region of the fuel element 11, and into the fission product trap 25. The passageway and fission product trap chamber are filled with a suitable material for trapping fission products produced in the nuclear fuel. It is preferred to utilize in the passageway 17 and trap 25 an inert, temperature stable, adsorbent material, such as activated charcoal in finely divided form. The channels 27 are provided with porous graphite plugs 36 which readily permit the exit flow of gas but which prevent the adsorbent material from passing therethrough.

Figure 4:
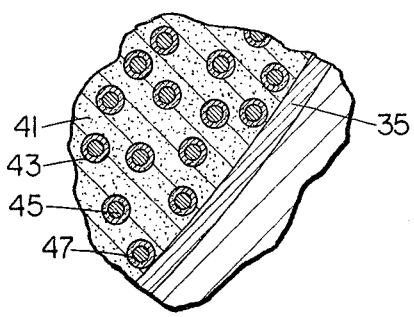
FIGURE 4 is an enlarged fragmentary view of FIGURE 3, showing the area at the outer surface of a fuel body.

The illustrated fuel compacts 15 are in the form of right circular cylinders with a central hollow core. Each compact is formed of a graphite matrix 41 (see FIGURE 4) wherein a plurality of particles 43 of nuclear fuel material are generally uniformly dispersed. The particles 43 contain centers 45 of fissionable and/or fissionable and fertile materials, as for example, uranium oxides, uranium carbides, thorium oxides, thorium carbides, mixtures of uranium and thorium oxides or carbides, etc. Other suitable nuclear fuels may also be used. The centers 45 are preferably spherical and are enclosed within individual, integral, outer jackets or coatings 47 which inhibit the migration of fission products therethrough.

Fuel particles coated with any suitable ceramic material, as for example, pyrolytic carbon, silicon carbide, aluminum oxide, zirconium carbide, etc., which retard fission product migration can be used in making the fuel body 15. The coatings 47 should have a thickness of sufficient depth to obviate any problem of recoil damage and provide the desired amount of fission product retention.

Particles 43 which are considered especially suitable for use in the fuel bodies 15 have been manufactured and sold by General Atomic Division of General Dynamics Corporation and are referred to as "triplex-coated" particles. "Triplex-coated" particles are more fully described in USAEC Report GA-4695, "Graphite-Matrix Fuels Development for the AVR," Chin et al., General Atomic Division of General Dynamics Corp., October 1963. These fuel particles contain three distinct layers of pyrolytic carbon which constitute coatings 47 inside of which the fissile and/or fertile material centers 45 are disposed. These coatings 47 comprise an inner layer of spongy carbon and two outer layers of dense carbon. They can, for example, be made by the deposition of pyrolytic carbon from an atmosphere containing a partial pressure of a gaseous hydrocarbon, using a fluidized bed technique or any other suitable coating procedure.

The innermost layer of spongy carbon is about 25 microns in thickness and can be deposited by heating a fluidized bed of particles in an acetylene-helium atmosphere at 1150° C. A layer of laminar carbon and a layer of columnar carbon complete the fuel particle coating 47. Either may be outermost. Laminar carbon may, for example, be deposited by using a temperature of about 1700° C. with a mixture of helium and methane. Columnar carbon may be deposited at a temperature of 1850° C. from a gaseous mixture of helium and methane using a fluidized bed technique.

Preferably, the fuel compacts 15 include fuel particles 43 in an amount of about 30 percent of their total volume. This figure depends upon the individual characteristics desired for the overall group of fuel elements that go into a reactor. Of course fuel bodies including a lesser volume percentage of fuel particles may be made. When volume percentages above 30 percent are used, the structural strength of the matrix should be considered.

Fuel compacts 15 may be made by mixing fuel particles with particles of graphite having an average particle size of about 200 microns in any suitable manner until the mixture is homogeneous. The coated fuel particles 43 may be of any suitable size but preferably have an average diameter of between about 500 microns and 900 microns, particles with an average diameter of about 700 microns being most preferred. Thereafter, the resultant mixture is compacted and densified under suitable temperature and pressure conditions, according to conventional ceramic or powder metallurgy techniques, to provide a cohesive stable fuel compact of any desired size and shape.

The object of the compacting and densifying steps is to provide a finished stable solid fuel compact with few passageways between voids, i.e., as dense as readily accomplishable. This tends to further reduce the rate of passage of fission products from the fuel compact 15. Moreover, the finished fuel compact 15 should be capable of withstanding temperatures of the order of 3000° F. over extended periods of time during operation of the reactor.

The dense fuel compacts 15 are enclosed, as shown in FIGURE 2, in the sleeve 13. Graphite is the preferred material for the sleeve 13, top reflector 19, and coupling section 20. However, graphite in its normal untreated form is relatively porous. To completely treat graphite sufficiently to provide a wholly effective barrier to gaseous fission products to prevent their escape from the cavity formed within the sleeve 13 is a very expensive proposition. However, it has been found that a fission products retentive chamber can be formed within the fuel element by treating the graphite to provide a thin layer 35 of barrier material at the surfaces of the cavity which forms a shell that is completely closed except for the opening formed by the passageway 29.

The barrier material applied to the surfaces of the cavity should be integral with the graphite in order to be durable in use, that is, the barrier material should be physically or chemically bonded with the graphite during or after application. It is preferred that the barrier material permeates down through the graphite in a diffusion zone which may be several mils thick, so as to minimize damage due to differential thermal expansion between the thin wall layer of barrier material and the graphite. Silicon carbide and zirconium carbide have excellent high temperature stability and suitably low thermal neutron capture cross-sections and are examples of suitable barrier materials. The preferred barrier material is silicon carbide.

The layer of barrier material 35 is perferably formed by treating the graphite walls of the cavity formed within the fuel element body section 12 by exposure to a gaseous substance which can be deposited on the internal walls of the cavity and either simultaneously or subsequently reacted to chemically combine with the graphite to form the desired carbide. The treating process may be performed after various components of the fuel elment 11 have been assembled to at least partially form the cavity, or each of the components may be individually treated as desired. In forming a barrier layer of silicon carbide, the graphite component may be exposed to a gaseous silicon compound at suitable temperature, pressure and time conditions to permit the desired amount of silicon to diffuse into the surface of the graphite to form a layer of sufficient depth.

The minimum desirable depth of the layer of barrier material 35 depends in part upon the operating conditions of the nuclear reactor in which the fuel element 11 is intended to be used and more importantly upon the density and permeability of the graphite which is being treated. The barrier layer should be sufficiently impermeable to the passage of fission products so that only a negligible migration of fission products occurs through the walls of the closed shell formed on the interior wall of the cavity. For example, when the helium, krypton or cesium permeability of the graphite sleeve 13 having a wall thickness of about 0.4 inch is not more than about $3 \times 10^{-1}$ cm.$^2$/sec., treatment of the sleeve to provide a barrier layer of silicon or zirconium carbide at least about 5 mils thick is considered suitable. The density of the barrier layer should be at least about 95 percent of theoretical density. The permeability of such a layer would be equal to or less than $1 \times 10^{-6}$ cm.$^2$/sec., which is considered suitable under most operating conditions.

A barrier layer of silicon carbide may be formed from a vaporous silicon compound, such as tetrachlorosilane or silicon tetrachloride. The silicon compound may be decomposed at a relatively low temperature in suitable atmosphere, such as hydrogen. The hydrogen serves as both a carrier and as a reactant in the pyrolytic decomposition. After treating, the temperature may be raised for a sufficient time to carry out the chemical reaction for formation of silicon carbide. It is believed that exposure to a mixture of tetrachlorosilane and hydrogen for about 20 minutes at 1300° C. wherein the partial pressure of tetrachlorosilane is from about 0.15 to 1.5 p.s.i.a. (total pressure 1 atm.) will suitably coat the desired graphite surfaces with silicon and diffuse silicon to a depth of about 2 to 20 mils, depending somewhat on the porous structure of the graphite and the particular silicon compound employed. A temperature of about 1400° C. to 1600° C. is suitable for converting the silicon to silicon carbide. Silicon carbide may also be deposited directly as silicon carbide by the use of a compound such as methyl trichlorosilane in a suitable atmosphere such as hydrogen. To form a zirconium carbide barrier layer, a similar process may be employed using a suitable mixture of zirconium tetrachloride in vapor form with hydrogen.

In operation of the fuel element 11 in a nuclear reactor the production of volatile fission products serves to build up pressure within the fuel element 11 in excess of the normal pressure of the fluid coolant stream. The silicon carbide layer 35 prevents release of this pressure via migration of the fission products into the coolant stream through the fuel element body section 12. The fission products accordingly seek a path of least resistance which is provided by the longitudinal passageway 17 and vented trap 25.

During the migration of the fission products through the passageway and trap, the metallic fission products are adsorbed. The length of the long path in the activated charcoal causes short-lived, gaseous fission products to decay to solid forms that are adsorbed, or to non-contaminating gaseous forms, before they reach the vent channel outlets 27. Accordingly, gaseous Kr$^{90}$ (half-life 33 sec.) decays to Rb$^{90}$—Sr$^{90}$ (solid) and gaseous Xe$^{140}$ (half life—16 sec.) decays to Cs$^{140}$—Ba$^{140}$ (solid). The solid Sr$^{90}$ and Ba$^{140}$ are then adsorbed and are prevented from contaminating the reactor fluid coolant circuit.

Accordingly, an improved fuel element has been described which features a unique system for retention and attenuation of fission products without using external trapping means or purge gas systems. The fuel element is capable of highly efficient and safe operation at elevated temperatures over extended periods of time without breaking down and without deleterious fission product buildup in the primary coolant circuit.

The following example further illustrates one method of making a fuel element embodying various of the features of the invention, but is intended to in no way limit the scope of the invention which is defined in the appended claims.

*Example*

A generally cylindrical fuel element 11 of a type suitable for use in the HTGR, which uses helium as a coolant, is made having a 5.0 inch diameter, as measured along the fuel body. The top reflector 19 is machined from a cylindrical piece of reactor grade graphite. The spacing ring 34 of the top reflector 19 is dimensioned to have a diameter of 5.05 inches so that, when fuel elements 11 are assembled in a reactor core, the outer surfaces of the adjacent fuel elements 11 will be spaced no closer than 0.10 inch. The bottom connector 21 is machined from a block of untreated reactor grade graphite having an outer diameter of 5 inches.

The graphite sleeve 13, the plug portion 18 of the top reflector 19 and the graphite coupling section 20 have an initial helium permeability of no more than about $3 \times 10^{-1}$ cm.$^2$/sec. The inner diameter of the sleeve 13 is about 4.0 inches.

The internal bore of the sleeve 13, the bottom face of the plug 18, and the upper face and passageway 29 of the coupling section 20 are then coated with SiC by pyrolytic decomposition of a silicon compound in a hydrogen atmosphere followed by a silicon-carbon reaction to form silicon carbide. The graphite components are first heated to about 1100° C. in a hydrogen atmosphere. Silicon tetrachloride is then vaporized at atmospheric pressure at a temperature of about 40° C. in a stream of hydrogen at a rate to create a silicon tetrachloride partial pressure of about 1.5 p.s.i.a. and caused to pass over the surfaces to be coated. The silicon deposition is allowed to proceed until a solid layer of silicon about 10 mils thick is formed. The treated sleeve 13 is then heated to 1500° C. for at least one hour to cause silicon carbide to be formed.

Fuel compacts 15 are prepared using conventional hot pressing techniques for graphite which contain approximately 30 percent fuel particles 43 by volume and 70 percent graphite. The fuel particles 43 contain approximately one part of uranium dicarbide to fifteen parts thorium dicarbide, coated with the aforementioned three layer pyrolytic carbon coating 47. The fuel compacts are formed in the shape of right circular cylinders having a central hole. The outer diameter of the cylinder is about 4.0 inches, the inner diameter is about 0.8 inch and the cylinders are about 4.0 inches high.

In assembling the fuel element for use in a reactor, the coupling section 20 is first screwed onto the sleeve 13. Fuel compacts 15 are then loaded in stacked array inside the bore of sleeve 13. The passageway formed by the hollow central cores of the stacked fuel compacts 15 is about 150 inches long and is in alignment with the passage 29 of the coupling section 20. The bottom connector 21 is then screwed onto the lower threads of the coupling 20. The mating cavities of the bottom connector 21 and the coupling 20 form a fission product trap 25 that measures 2.5 inches in diameter by 24 inches long. The fission product trap 25 and the passageway formed by the central holes of the fuel bodies 23 and the upper portion of the bottom connector 21 are then filled with activated charcoal using a vibratory compaction technique to insure lack of void space. The packed charcoal has a density of about 0.5 gm./cc. The top reflector 19 is then screwed onto the sleeve 13 and the threaded joints at the top and bottom of the sleeve 13 are sealed by silicon brazing.

The fuel element 11 is then ready for use in a nuclear reactor.

The cesium trapping ability of the fuel element 11 is tested by operating the fuel element under simulated reactor conditions to cause nuclear fuel burn-up of about 8 percent. Neutron exposure during burn-up is about $4 \times 10^{21}$NVT ($>0.18$ mev.). The outer temperature of the fuel element is maintained at about 1000° C. using a helium coolant stream at about 30 p.s.i.a. Monitoring of the coolant stream shows that the fraction of radioactive cesium and xenon that is created which reaches the coolant stream is less than about $1 \times 10^{-5}$. The fuel element 11 is considered to have excellent fission product trapping characteristics and may be advantageously used in high temperature gas-cooled nuclear reactors.

It will be appreciated that such modifications in the components of the fuel element of the present invention, in their combination, and in their methods of fabrication as are within the skill of those versed in the art are contemplated as being within the scope of the present invention.

Various features of the invention are set forth in the following claims.

What is claimed is:

1. A non-purged fuel element for a nuclear reactor, which fuel element comprises a fuel element body section made of graphite and having a cavity formed therein, the entire internal wall surface of said cavity having been treated to provide therein a layer of material selected from the group consisting of silicon carbide and zirconium carbide, said layer forming a closed shell within said fuel element body section having excellent resistance to the passage of fission products, opening means in said fuel element body section leading to said cavity which provides the only entry to the interior of said shell, nuclear fuel material disposed within said cavity, fission product trapping means in connection with said fuel element body section, said fission product trapping means being in fluid communication with the interior of said shell through said opening means, and vent means connecting said fission product trapping means in fluid communication with the exterior of said fuel element whereby internal pressure caused by fission product formation within said shell is relieved by venting fission products through said trapping means into the fluid coolant stream flowing exterior of the fuel element.

2. A non-purged fuel element for a nuclear reactor, which fuel element comprises a fuel element body section made of graphite and having a cavity formed therein, the entire internal wall surface of said cavity having been treated to provide thereon a layer of material at least about 5 mils thick selected from the group consisting of silicon carbide and zirconium carbide, the density of said layer being at least about 95 percent of maximum theoretical, said layer forming a closed shell within said fuel element body section having excellent resistance to the passage of gaseous and metallic fission products, opening means in said fuel element body section leading to said cavity which provides the only entry to the interior of said shell, nuclear fuel material disposed within said cavity, fission product trapping means in connection with said fuel element body section, said fission product trapping means being in fluid communication with the interior of said shell through said opening means, and vent means connecting said fission product trapping means in fluid communication with the exterior of said fuel element whereby internal pressure caused by fission product formation within said shell is relieved by venting gaseous fission products through said trapping means into the fluid coolant stream flowing exterior of the fuel element.

3. A non-purged fuel element for a nuclear reactor, which fuel element comprises a fuel element body section made of graphite and having a cavity formed therein, the entire internal wall surface of said cavity having been treated to provide thereon a layer of material selected from the group consisting of silicon carbide and zirconium carbide, said layer forming a closed shell within said fuel element body section having excellent resistance to the passage of gaseous and metallic fission products, opening means in said cavity which provides the only entry to the interior of said shell, a nuclear fuel compact disposed within said cavity, having a hollow core that forms a fission product passageway, a fission product trap in connection with said fuel element body section, adsorbent material filling said trap and said passageway, said fission product trap being in fluid communication with the interior of said shell through said opening means, and vent means connecting said fission product trap in fluid communication with the exterior of said fuel element whereby internal pressure caused by fission product formation within said shell is relieved by venting gaseous fission products through said trapping means into the fluid coolant stream flowing exterior of the fuel element.

4. A non-purged fuel element for a nuclear reactor, which fuel element comprises an elongated fuel element body section made of graphite and having a longitudinally extending cavity formed therein, the entire internal wall surface of said cavity having been treated to provide thereon a layer of material selected from the group consisting of silicon carbide and zirconium carbide, said layer forming a closed shell within said fuel element body section having excellent resistance to the passage of gaseous and metallic fission products, opening means at one end of said longitudinal cavity which provides the only entry to the interior of said shell, a plurality of nuclear fuel compacts disposed within said cavity each having a hollow central core, said hollow cores being aligned to provide a longitudinal passageway through said fueled region, a fission product trap in connection with said fuel element body section, one end of said fission product trap being in fluid communication with the interior of said shell through said opening means, adsorbent material filling said trap and passageway, and vent means connecting the other end of said fission product trap in fluid communication with the exterior of said fuel element whereby internal pressure caused by fission product formation within said shell is relieved by venting gaseous fission products through said trapping means into the fluid coolant stream flowing exterior of the fuel element.

5. A non-purged fuel element for a nuclear reactor, which fuel element comprises an elongated fuel element body section made of graphite and having a longitudinally extending cavity formed therein, said body section including a sleeve portion that laterally bounds said cavity, which sleeve portion is at least 0.4 inch thick and has a permeability of not more than $3 \times 10^{-1}$cm.$^2$/sec. measured with helium at 25° C., the entire internal wall surface of said cavity having been treated with a silicon compound in vapor form to provide thereon a layer of silicon carbide at least about 5 mils thick and of a density at least about 95 percent of theoretical, said layer forming a closed shell within said fuel element body section having excellent resistance to the passage of gaseous and metallic fission products, opening means at one end of said longitudinal cavity which provides the only entry to the interior of said shell, a plurality of nuclear fuel compacts disposed within said cavity each having a hollow central core, said hollow cores being aligned to provide a longitudinal passageway through said fueled region, a fission product trap in connection with said fuel element body section, one end of said fission product trap being in fluid communication with the interior of said shell through said opening means, adsorbent material filling said trap and said passageway, and vent means connecting the other end of said fission product trap in fluid communication with the exterior of fuel element whereby internal pressure caused by fission product formation within said shell is relieved by venting gaseous fission products through said trapping means into the fluid coolant stream flowing exterior of the fuel element.

References Cited by the Examiner

UNITED STATES PATENTS

| | | | |
|---|---|---|---|
| 3,039,944 | 6/1962 | Zumwalt | 176—68 |
| 3,135,665 | 6/1964 | Koutz et al. | 176—71 |
| 3,137,636 | 6/1964 | Wikner | 176—68 |
| 3,141,829 | 7/1964 | Fortescue et al. | 176—71 X |
| 3,146,173 | 8/1964 | Fortescue et al. | 176—71 |

BENJAMIN R. PADGETT, *Acting Primary Examiner.*

M. J. SCOLNICK, *Assistant Examiner.*